(12) United States Patent
Asano

(10) Patent No.: US 9,341,924 B2
(45) Date of Patent: May 17, 2016

(54) ELECTRONIC APPARATUS

(71) Applicant: Panasonic Corporation, Osaka (JP)

(72) Inventor: Hiroki Asano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/479,739

(22) Filed: Sep. 8, 2014

(65) Prior Publication Data

US 2014/0375874 A1    Dec. 25, 2014

Related U.S. Application Data

(63) Continuation of application No. PCT/JP2013/004067, filed on Jul. 1, 2013.

(30) Foreign Application Priority Data

Jul. 9, 2012    (JP) .................................. 2012-153282

(51) Int. Cl.
*G03B 17/56* (2006.01)
*H04N 5/225* (2006.01)
*G03B 17/02* (2006.01)
*G08B 13/196* (2006.01)

(52) U.S. Cl.
CPC .............. *G03B 17/561* (2013.01); *G03B 17/02* (2013.01); *H04N 5/2252* (2013.01); *G08B 13/19619* (2013.01); *H04N 5/2251* (2013.01)

(58) Field of Classification Search
CPC .... G03B 17/561; G03B 17/02; H04N 5/2252; H04N 5/2251; G08B 13/19619

USPC .......... 396/427, 428, 535, 541; 348/373, 374, 348/143

See application file for complete search history.

(56) References Cited

U.S. PATENT DOCUMENTS

| 7,841,782 B2 | 11/2010 | Tatewaki |
| 7,990,468 B2 | 8/2011 | Yamamoto |
| 8,066,438 B2 | 11/2011 | Takahashi |
| 8,164,686 B2 | 4/2012 | Togawa |
| 2008/0211913 A1 | 9/2008 | Togawa |

(Continued)

FOREIGN PATENT DOCUMENTS

| JP | 08-102880 A | 4/1996 |
| JP | 3029339 U | 7/1996 |

(Continued)

OTHER PUBLICATIONS

International Search Report for corresponding International Application No. PCT/JP2013/004067 mailed Oct. 8, 2013.

(Continued)

*Primary Examiner* — Rochelle-Ann J Blackman
(74) *Attorney, Agent, or Firm* — Renner, Otto, Boisselle & Sklar, LLP

(57) ABSTRACT

An electronic apparatus includes a first unit, a second unit held by the first unit, and a third unit held by the first unit via the second unit. The first unit has a first rotation regulating portion that regulates the rotation of the second unit in a first direction, a second rotation regulating portion that regulates the rotation of the third unit in the first direction, and a third rotation regulating portion that regulates the rotation of the second unit and the third unit in a second direction opposite to the first direction.

16 Claims, 14 Drawing Sheets

(56) References Cited

U.S. PATENT DOCUMENTS

| | | |
|---|---|---|
| 2009/0162048 A1 | 6/2009 | Tatewaki |
| 2010/0225802 A1 | 9/2010 | Yamamoto |
| 2011/0013900 A1 | 1/2011 | Takahashi |

FOREIGN PATENT DOCUMENTS

| | | |
|---|---|---|
| JP | 10-083703 A | 3/1998 |
| JP | 2003-319480 A | 11/2003 |
| JP | 2007-110484 A | 4/2007 |
| JP | 2007-176581 A | 7/2007 |
| JP | 2007-227994 A | 9/2007 |
| JP | 2008-219316 A | 9/2008 |
| JP | 2011-023856 A | 2/2011 |

OTHER PUBLICATIONS

International Preliminary Report on Patentability (English Translation) for International Application No. PCT/JP2013/004067, dated Jan. 22, 2015.

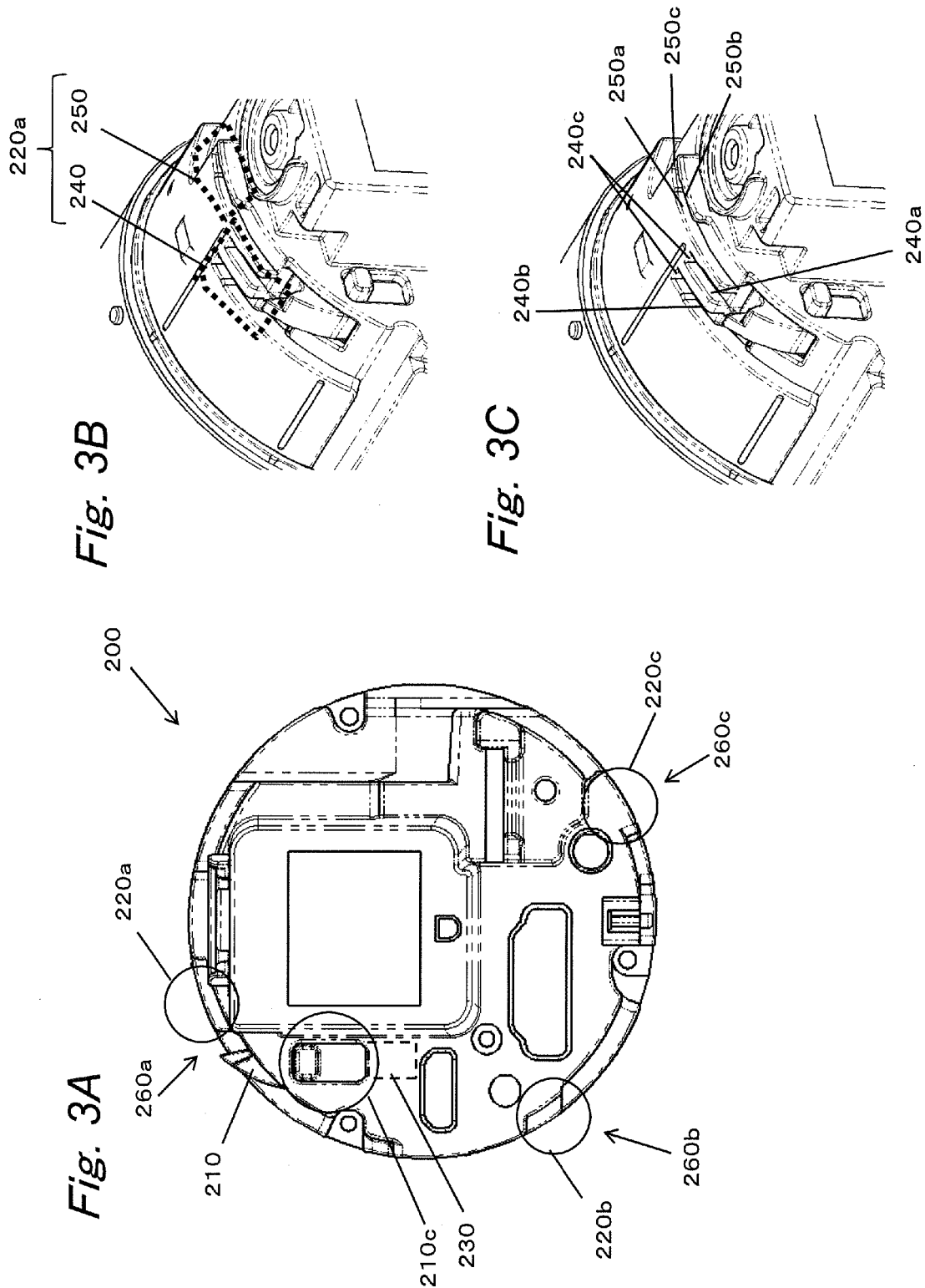

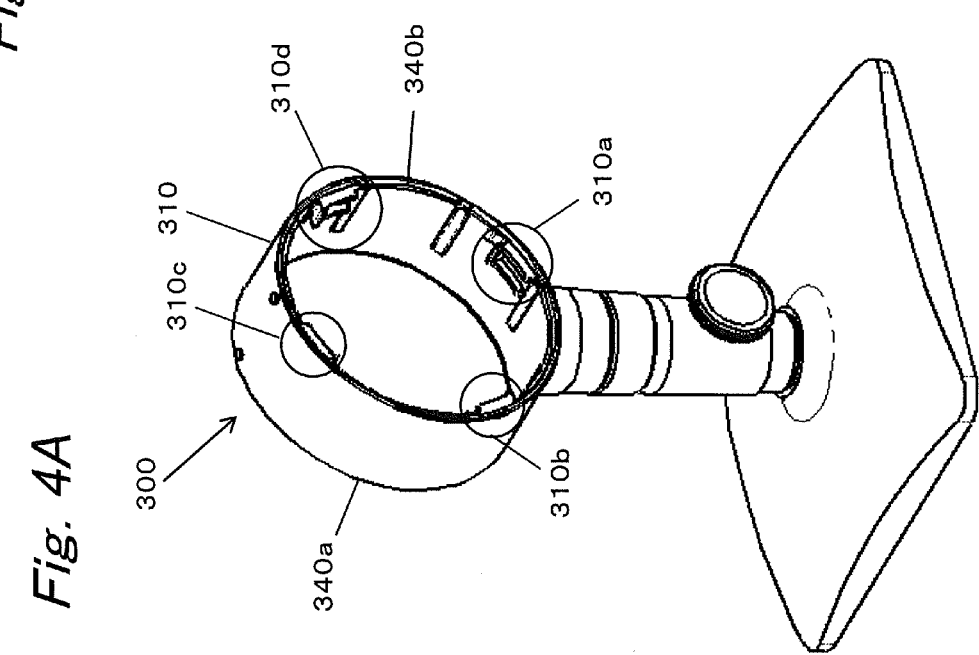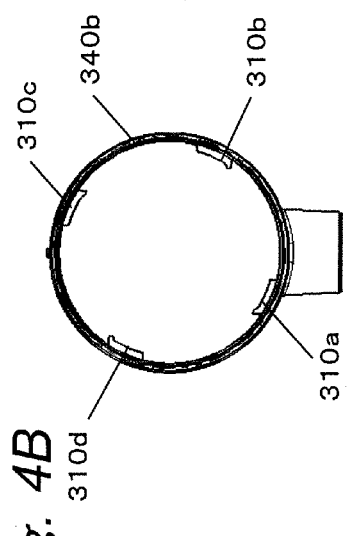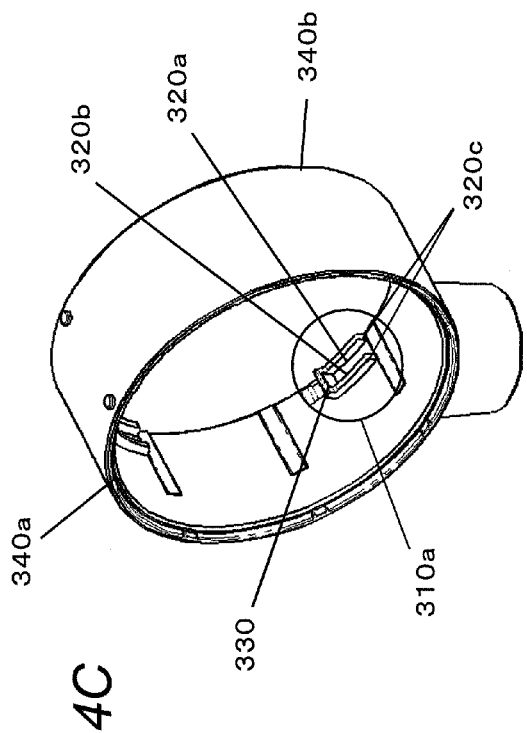

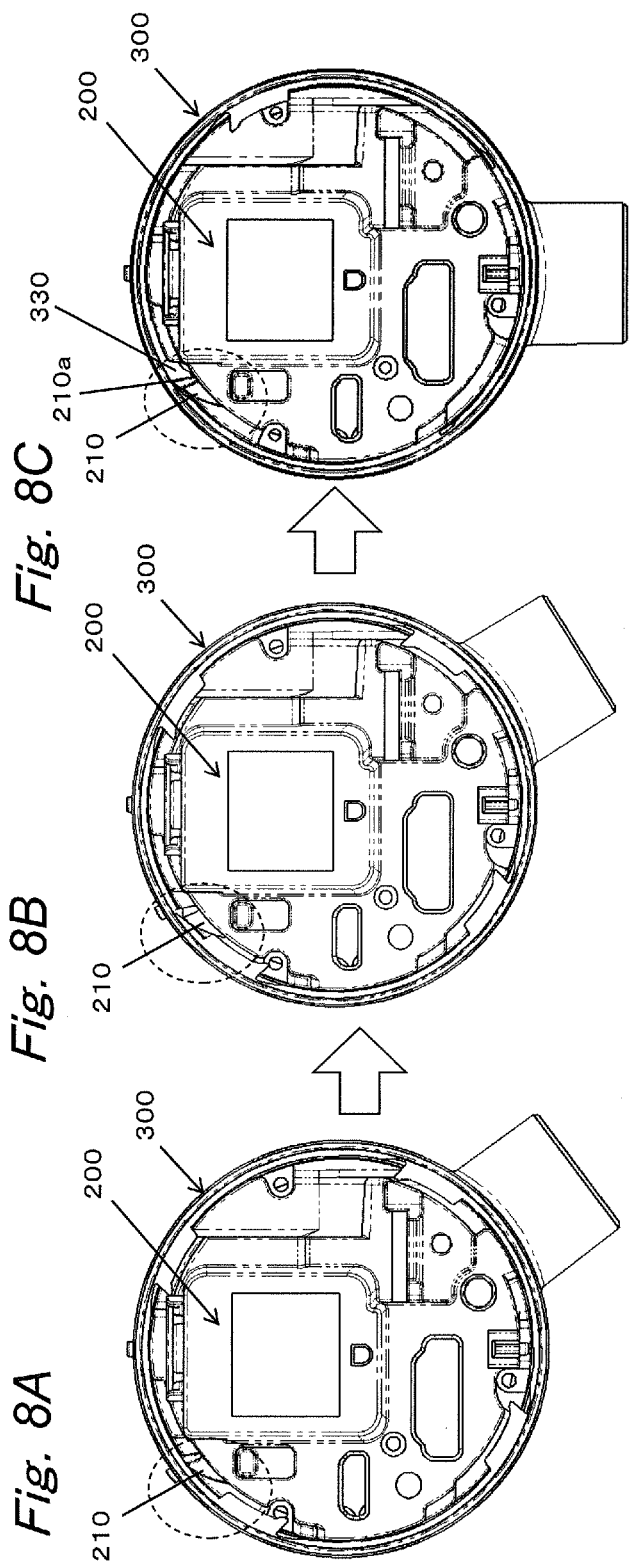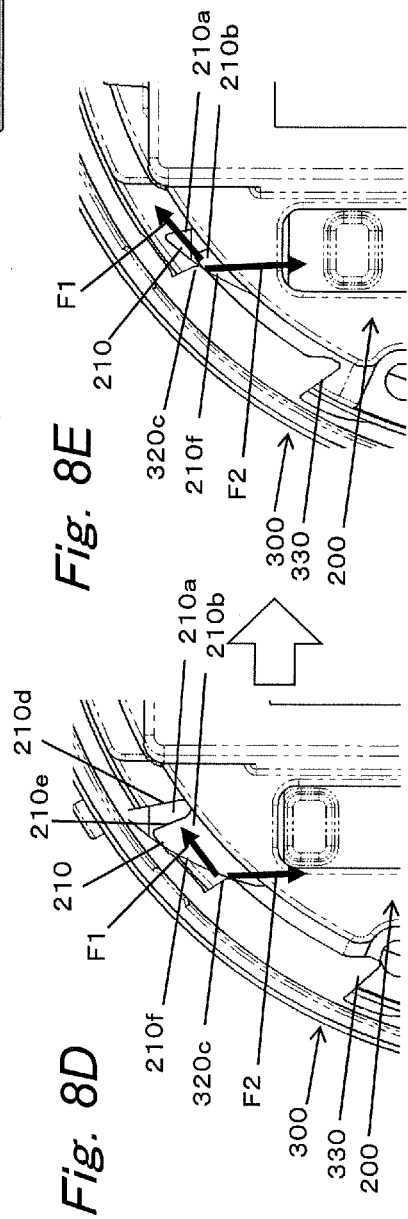

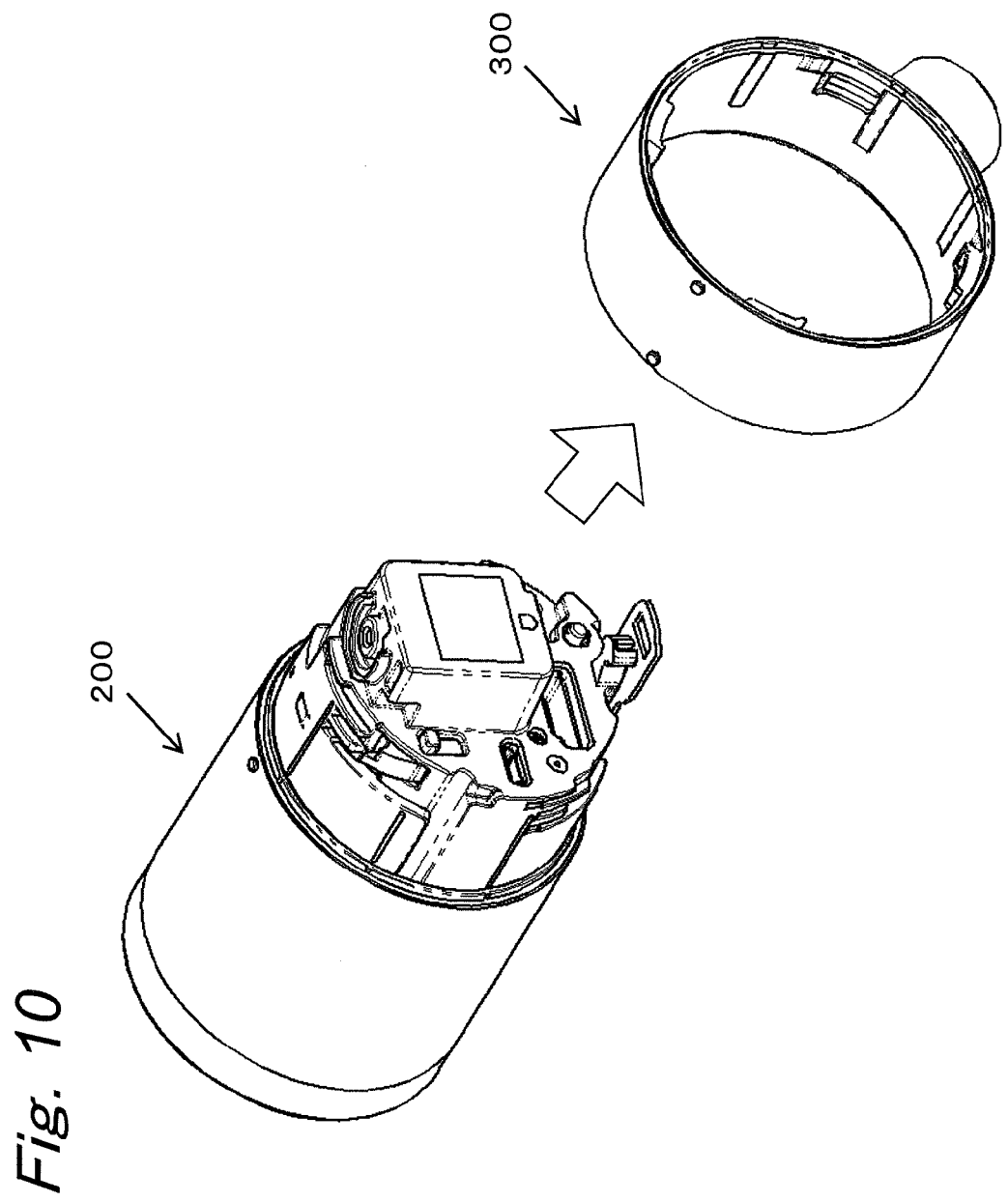

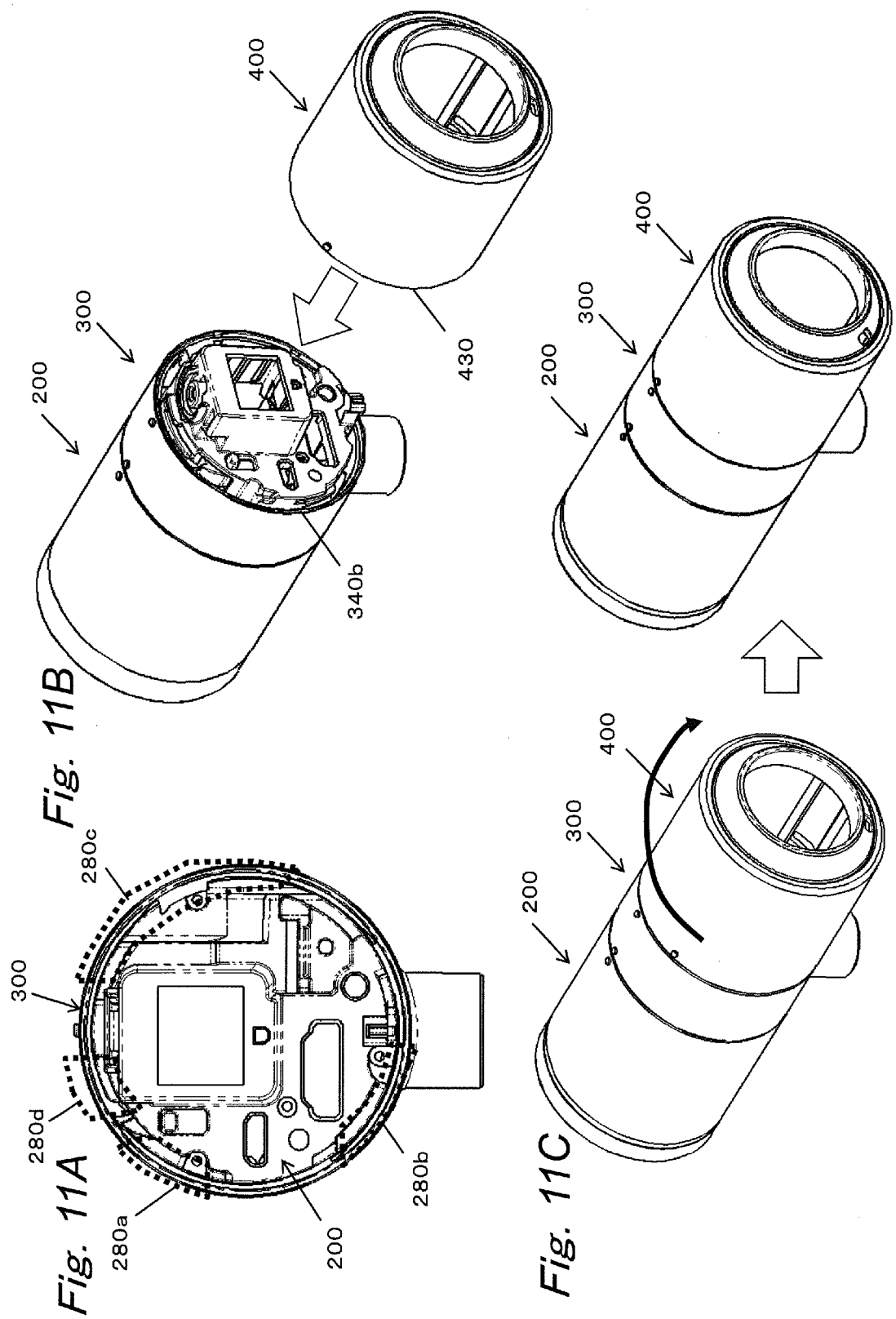

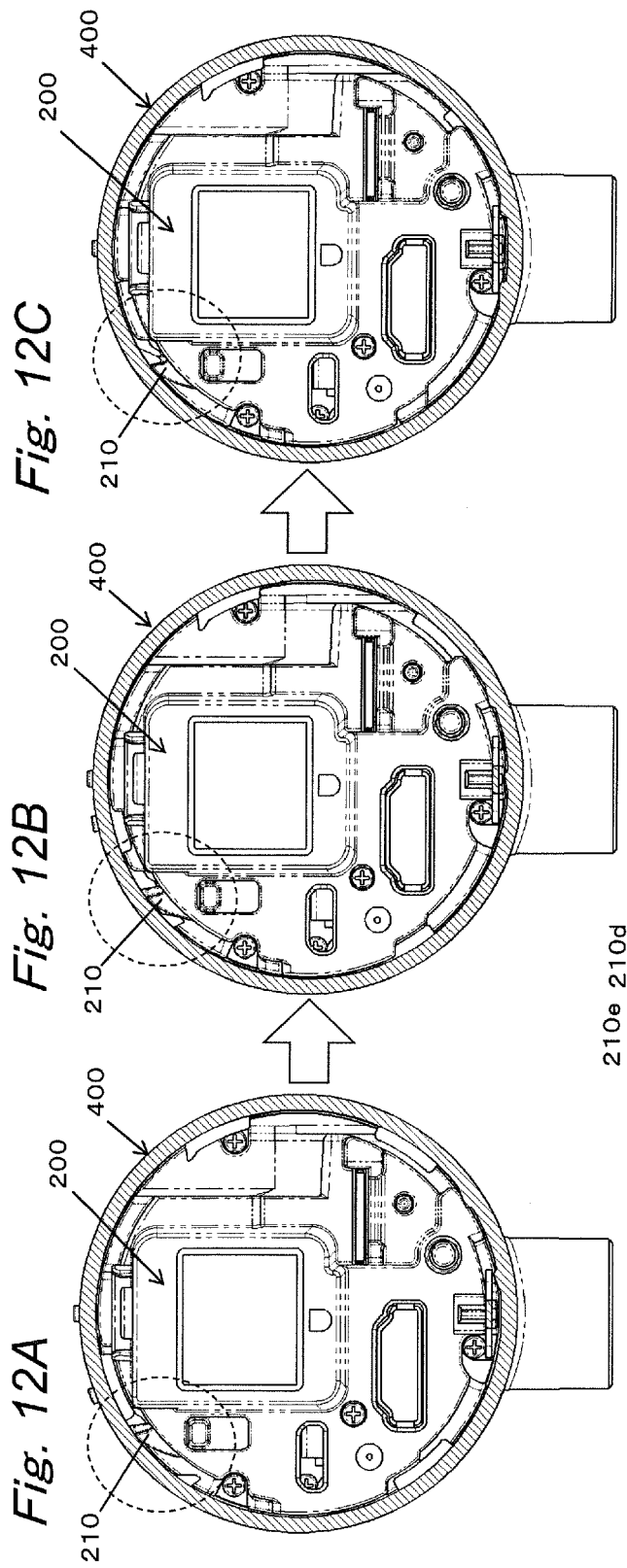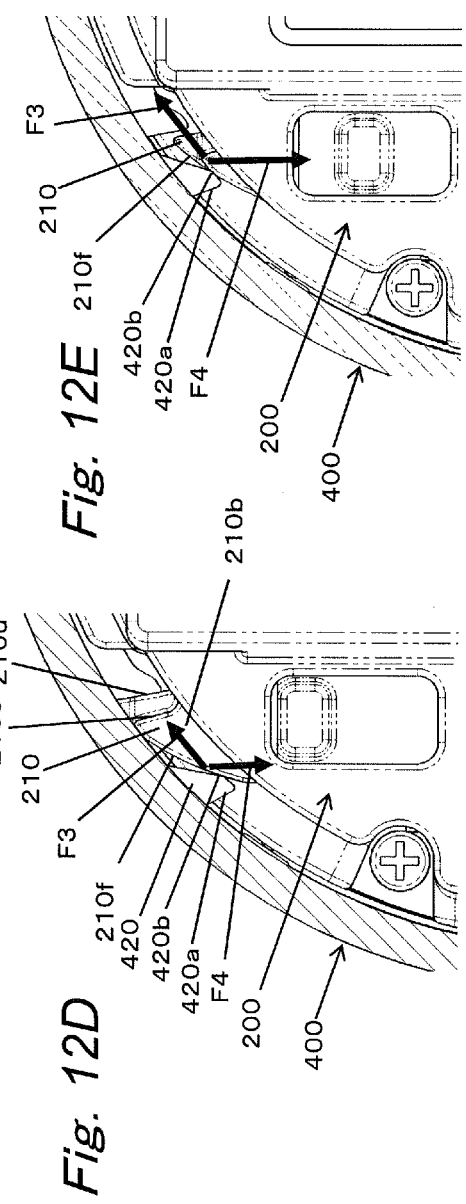

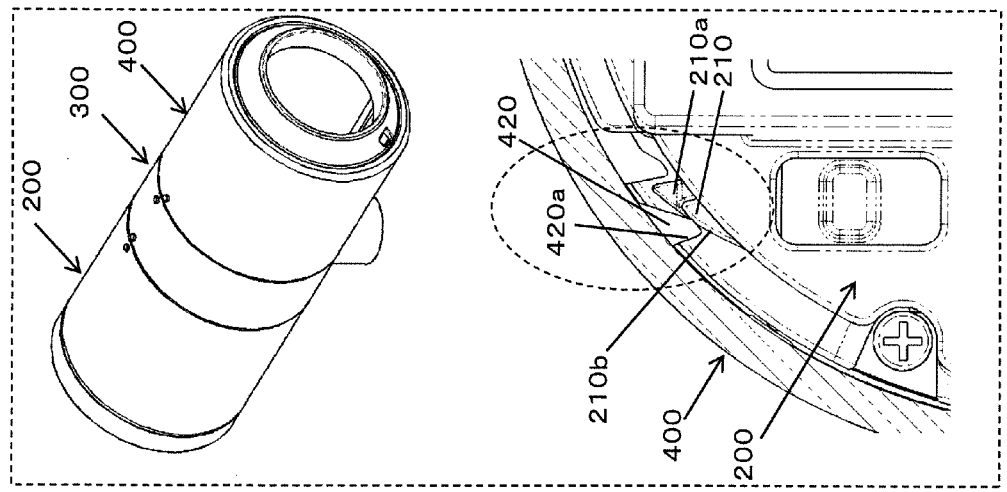
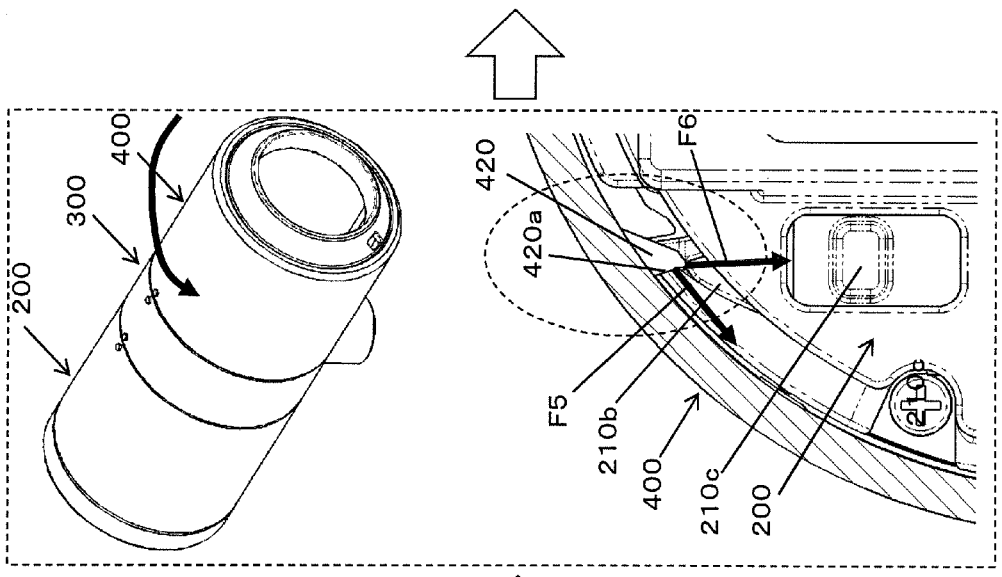
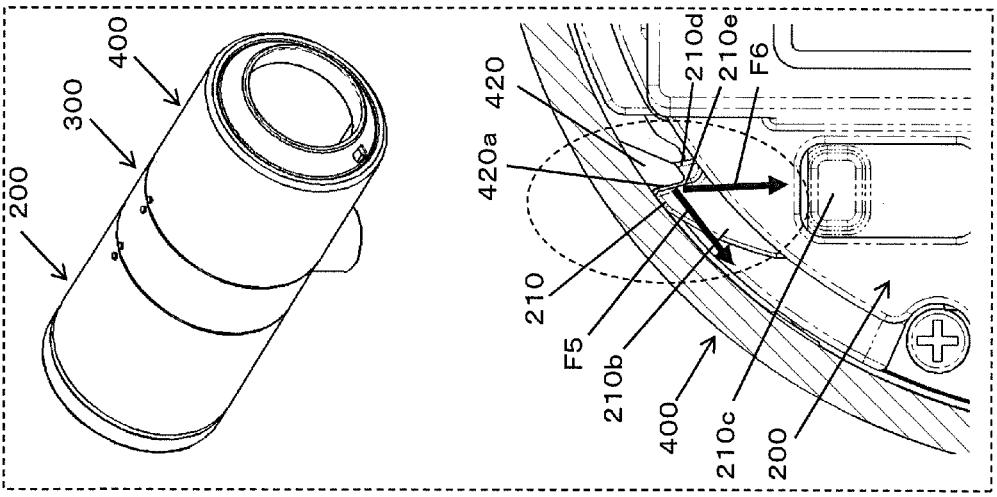

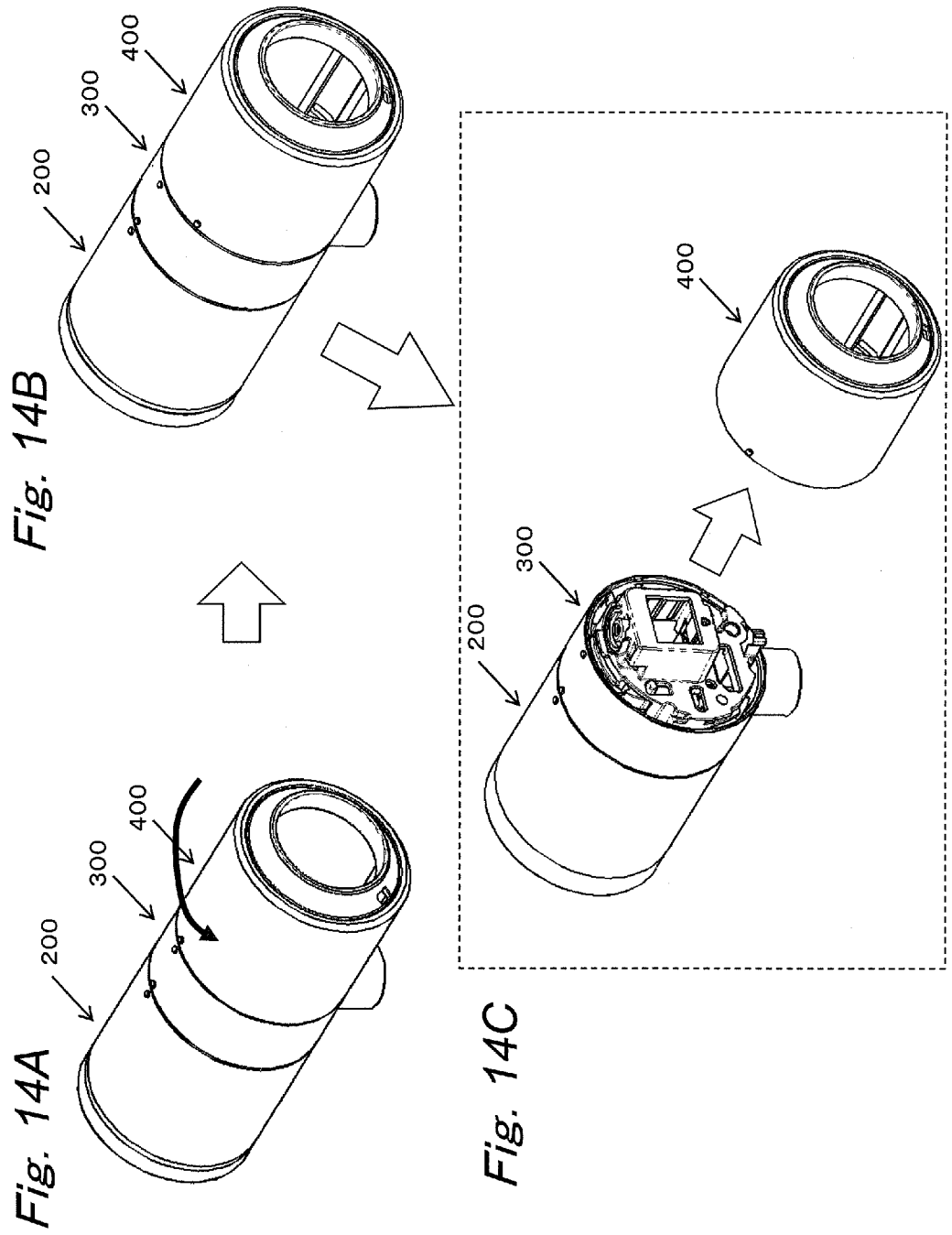

ELECTRONIC APPARATUS

CROSS-REFERENCE TO RELATED APPLICATIONS

This is a continuation application of International Application No. PCT/JP2013/004067, with an international filing date of Jul. 1, 2013, which claims priorities of Japanese Patent Application No.: 2011-132978 filed on Jun. 15, 2011, and Japanese Patent Application No.: 2012-153282 filed on Jul. 9, 2012, the contents of which are incorporated herein by references.

BACKGROUND

1. Technical Field

This disclosure relates to an electronic apparatus having a holding member.

2. Related Art

An electronic apparatus, such as a camera unit, is sometimes mounted on a base via a holding member and is hung from a ceiling. It is desirable that the electronic apparatus be easily mounted on the holding member.

The electronic apparatus mounted on the holding member is disclosed in Japanese Patent Application Laid-Open (JP-A) No. 2003-319480.

SUMMARY

This disclosure provides an electronic apparatus which can be easily mounted.

An electronic apparatus includes a first unit, a second unit held by the first unit, and a third unit held by the first unit via the second unit.

The first unit has:

a first rotation regulating portion that regulates the rotation of the second unit in a first direction;

a second rotation regulating portion that regulates the rotation of the third unit in the first direction; and a third rotation regulating portion that regulates the rotation of the second unit and the third unit in a second direction opposite to the first direction.

According to this disclosure, the electronic apparatus which can be easily mounted can be provided.

BRIEF DESCRIPTION OF DRAWINGS

FIGS. 3A to 3C are diagrams for explaining the configurations of the rear surface side of the camera body;

FIGS. 4A to 4C are diagrams for explaining the configurations of a holding member;

FIGS. 8A to 8E are state transition diagrams of the operation of engaging the holding member by a lock piece;

FIG. 10 is a diagram showing the state of removing the holding member from the camera body;

FIGS. 11A to 11C are state transition diagrams of the operation of engaging the camera body with the protecting member;

FIGS. 12A to 12E are state transition diagrams of the operation of engaging the protecting member by the lock piece;

FIGS. 13A to 13C are state transition diagrams of the operation of releasing the engagement of the camera body with the protecting member; and FIGS. 14A to 14C are diagrams showing the states of rotating the protecting member clockwise with respect to the camera body.

DETAILED DESCRIPTION OF PREFERRED EMBODIMENT

Figure 1:
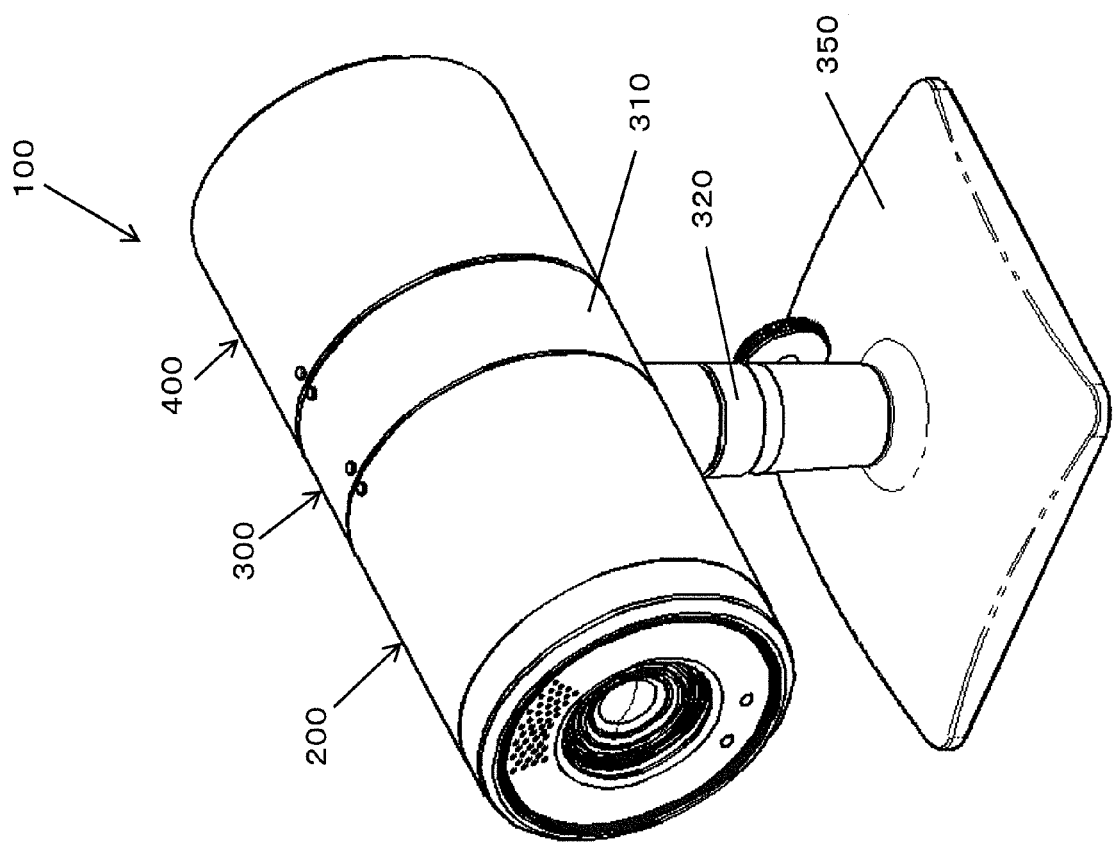
FIG. 1 is a diagram for explaining the overall configuration of a remote camera.

Hereinafter, an embodiment will be described in detail by appropriately referring to the drawings. However, needlessly detailed description can be omitted. For instance, detailed description about well-known matters and overlapped description about substantially the same configuration can be omitted. This is for avoiding the following description from being redundant and for allowing those skilled in the art to easily understand this disclosure. The present inventor(s) will provide the accompanying drawings and the following description so that those skilled in the art can fully understand this disclosure. These do not intend to limit the subject matter as claimed in claims.

1. Configuration 1-1. The Overview of the Configuration of a Remote Camera

The overall configuration of a remote camera 100 will be described with reference to FIG. 1. FIG. 1 is an overall view of the remote camera. The remote camera 100 has a camera body 200, a holding member 300, and a protecting member 400. The camera body 200 is a unit performing capturing an image, recording a sound, and storing them. The holding member 300 has a ring 310, a camera platform 320, and a base 350. The ring 310 directly holds the camera body 200. The camera platform 320 supports the ring 310. The base 350 supports the camera platform 320. The holding member 300 is a unit holding the camera body 200 and mounting the camera body 200 on a wall surface, and the like. The protecting member 400 covers the periphery of a connection terminal, such as a cable, provided in the rear portion of the camera body 200. The protecting member 400 protects the connection terminal.

In the following description, the end side of the remote camera 100 on which a lens is present is the front. The clockwise and counterclockwise directions in the front of the remote camera 100 are defined as the clockwise and counterclockwise directions. The upper direction in the vertical direction of the remote camera 100 is defined as the upper direction and the lower direction in the vertical direction of the remote camera 100 is defined as the lower direction, in the case that the base 350 of the remote camera 100 is placed on the horizontal plane.

1-2. The Configuration of the Camera Body

Figure 2A:
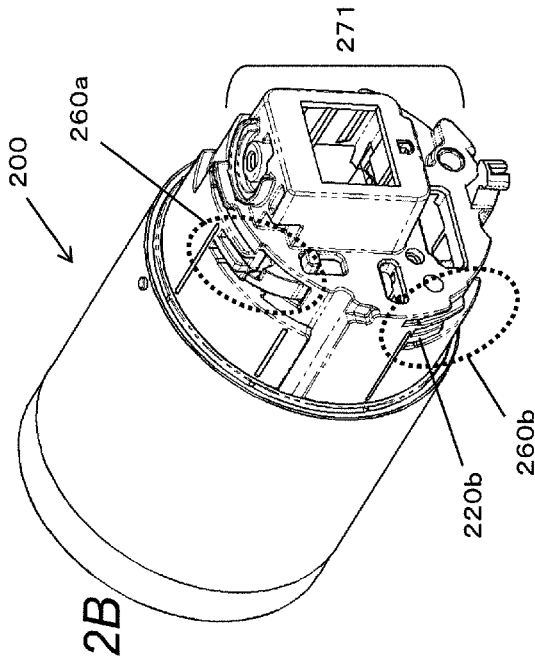
FIGS. 2A to 2D are diagrams for explaining the configurations of a camera body.

The configuration of the camera body 200 will be described with reference to FIGS. 2A to 2D. FIG. 2A is an overall view of the camera body 200. The camera body 200 has the lens, a driver, an imaging sensor, an image processor, and the connection terminal. The driver drives the lens. The imaging sensor captures a subject image formed through the lens. The image processor performs predetermined process to an output from the imaging sensor. The connection terminal outputs a result processed by the image processor.

Figure 2B:
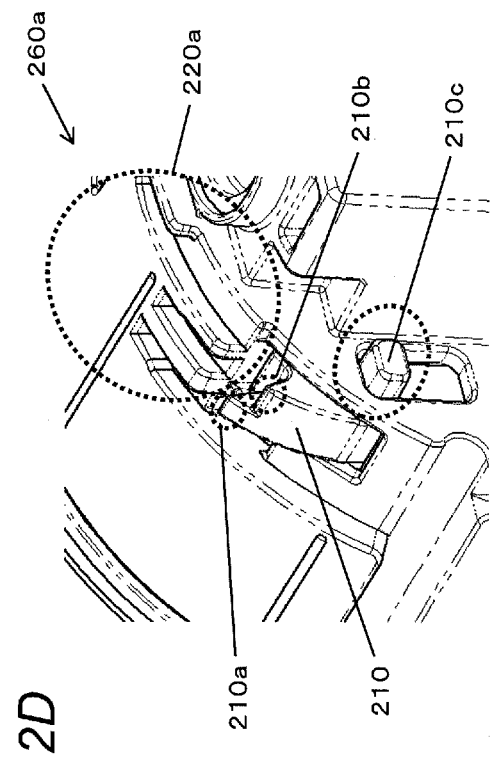
Figure 2C:
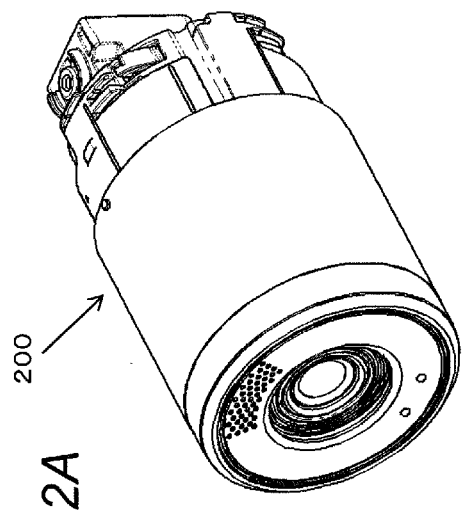
Figure 2D:
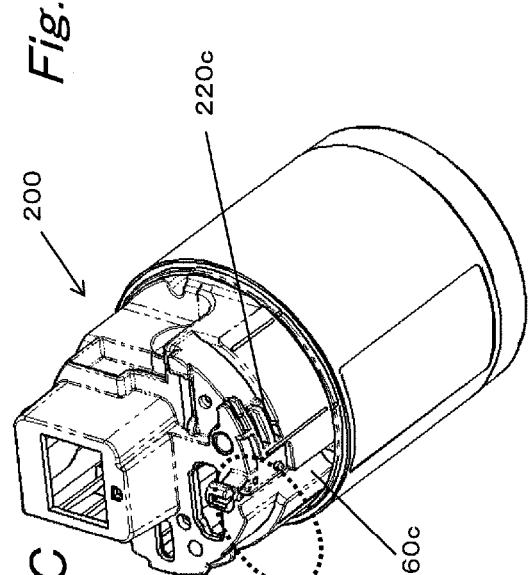

FIG. 2B is a perspective view of the camera body 200, seen from the rearward-diagonally upward side thereof. FIG. 2C is a perspective view of the camera body 200, seen from the rearward-diagonally downward side thereof. FIG. 2D is a partially enlarged view of FIG. 2B. As shown in FIG. 2B, the camera body 200 has a connection terminal 271 at the rear end thereof opposite to the front end thereof at which the lens is present. The camera body 200 has holding mechanisms which hold the camera body 200 around the rear end thereof. The camera body 200 has, as the holding mechanisms, a first holding mechanism 260a, a second holding mechanism 260b, and a third holding mechanism 260c.

The first holding mechanism 260a allows the holding member 300 to hold the camera body 200 to regulate the forward-rearward movement and the clockwise and counterclockwise rotation of the holding member 300 with respect to the camera body 200. As shown in FIG. 2D, the first holding mechanism 260a has a lock piece 210 and a rib 220a. The lock piece 210 regulates the clockwise rotation (position) of the holding member 300 with respect to the camera body 200. In addition, the lock piece 210 regulates the clockwise rotation of the protecting member 400 with respect to the camera body 200. The detail of the rotation regulation by the lock piece 210 will be described later. The rib 220a regulates the counterclockwise rotation of the holding member 300 with respect to the camera body 200. In addition, the rib 220a regulates the counterclockwise rotation of the protecting member 400 connected to the camera body 200. That is, the rib 220a regulates the rotation of the protecting member 400 in the opposite direction with respect to the direction of the rotation of the lock piece 210. Further, the rib 220a regulates the forward-rearward movement of the holding member 300 connected to the camera body 200, and regulates the forward-rearward movement of the protecting member 400 connected to the camera body 200.

The detail of the rotation regulation by the lock piece 210 will be described. The lock piece 210 has a first protrusion 210a, a second protrusion 210b, and a lock lever 210c. The first protrusion 210a contacts a first protrusion contact portion 330 (see FIG. 4C) of the holding member 300, and regulates the clockwise rotation of the holding member 300 with respect to the camera body 200. The surface, which contacts the first protrusion contact portion 330, of the first protrusion 210a is referred to as a first contact surface 210d (see FIG. 9A). The second protrusion 210b contacts a second protrusion contact portion 420a (see FIGS. 13A and 13B) of the protecting member 400, and regulates the clockwise rotation of the protecting member 400 with respect to the camera body 200. The surface, which contacts the protecting member 400, of the second protrusion 210b is referred to as a second contact surface 210e (see FIG. 13A).

The lock piece 210 can be moved between a first position and a second position. The first position is a position where the first protrusion 210a of the lock piece 210 is engaged with the holding member 300 and the second protrusion 210b of the lock piece 210 is engaged with the protecting member 400. The second position is a position where the engagement of the first protrusion 210a of the lock piece 210 with the holding member 300 is released. At this time, the engagement of the second protrusion 210b of the lock piece 210 with the protecting member 400 is also released. That is, the lock piece 210 protrudes in the first position more than in the second position. The camera body 200 has a spring 230 which biases the lock piece 210 to protrude to the outer side of the camera body 200 (see FIG. 3A). The lock piece 210 is moved to the second position on the lower side when a load is applied from the direction opposite to the bias direction of the spring 230, and is moved to the first position on the upper side when the load is released. The load is applied to the lock piece 210 to move the lock piece 210 to the second position in FIGS. 2A and 2B so that the regulation of the clockwise rotation of the holding member 300 and the protecting member 400 can be released.

The state of holding the holding member 300 and the protecting member 400 with respect to the camera body 200 and the state of removing the holding member 300 and the protecting member 400 from the camera body 200 can be switched by switching the position of the lock piece 210 between the first position and the second position.

The angle of the second contact surface 210e, which contacts the protecting member 400, of the second protrusion 210b is formed gentler than the angle of the first contact surface 210d, which contacts the holding member 300, of the first protrusion 210a. Specifically, the angle formed by the second contact surface 210e with respect to the movement direction of the lock piece 210 is formed larger than the angle formed by the first contact surface 210d with respect to the movement direction of the lock piece 210. With this, when a rotation load above a certain level is applied in the direction opposite to the regulation direction, the regulation of the rotation of the protecting member 400 can be released more easily than the holding member 300. In other words, the engagement of the protecting member 400 with the camera body 200 can be released more easily than the engagement of the holding member 300 with the camera body 200. In this embodiment, the engagement of the holding member 300 with the camera body 200 can also be released by operating the lock piece 210. This is for easily removing the holding member 300 from the camera body 200 without applying the rotation load.

Further, the second protrusion 210b is formed so that the engaging amount of the second protrusion 210b with respect to the protecting member 400 when the second protrusion 210b contacts the protecting member 400 is smaller than the engaging amount of the first protrusion 210a with respect to the holding member 300 when the first protrusion 210a contacts the holding member 300. With this, as described later, even when the engagement of the protecting member 400 with the camera body 200 is released, the engagement of the holding member 300 with the camera body 200 cannot be released.

The reason why the rotation regulation can be easily released by applying the rotation load by a force above a certain level in the direction opposite to the regulation direction will be described. In the remote camera 100, when the camera body 200, the holding member 300, and the protecting member 400 are engaged with each other, the lock piece 210 is covered by the protecting member 400. Consequently, the user cannot operate the lock piece 210 from the outside. It is thus necessary to be able to remove the protecting member 400 from the camera body 200 without operating the lock piece 210. To cope with this, as described above, the angle formed by the second contact surface 210e with respect to the movement direction of the lock piece 210 is larger than the angle formed by the first contact surface 210d with respect to the movement direction of the lock piece 210. With this, when the protecting member 400 or the holding member 300 is rotated counterclockwise, the lock piece 210 can be moved to the second position by a smaller rotation force when the protecting member 400 is rotated than when the holding member 300 is rotated. Therefore, the protecting member 400 can be rotated and removed more easily than the holding member 300. For instance, the angle formed by the second contact surface 210e with respect to the movement direction of the lock piece 210 is set to the angle at which the protecting member 400 can be removed from the camera body 200 without operating the lock piece 210 by the typical user.

In addition, in the lock piece 210 of the camera body 200, the amount of the engagement of the second protrusion 210b with the protecting member 400 is smaller than the amount of the engagement of the first protrusion 210a with the holding member 300. With this, at the time of removing the protecting member 400 from the camera body 200 by rotating the protecting member 400, even when the engagement of the second protrusion 210b with the second protrusion contact portion 420a is released, the engagement of the first protrusion 210a with the first protrusion contact portion 330 is not released.

The second holding mechanism 260b and the third holding mechanism 260c allow the holding member 300 to hold the camera body 200 to regulate the forward-rearward movement and the counterclockwise rotation of the holding member 300 with respect to the camera body 200. At the same time, the second holding mechanism 260b and the third holding mechanism 260c allow the holding member 300 to hold the camera body 200 to regulate the forward-rearward movement and the counterclockwise rotation of the protecting member 400 with respect to the camera body 200. As shown in FIG. 2B, the second holding mechanism 260b has a rib 220b. The third holding mechanism 260c has a rib 220c.

FIGS. 3A to 3C are diagrams of the camera body 200, seen from the rear surface side thereof. FIG. 3A is a rear view of the camera body 200. As shown in FIG. 3A, the first holding mechanism 260a, the second holding mechanism 260b, and the third holding mechanism 260c are on the periphery of the rear end of the camera body 200. The first holding mechanism 260a, the second holding mechanism 260b, and the third holding mechanism 260c may be distributed on the outer side of the camera body 200 in the circumferential direction. With this, a load caused by regulating the rotating operation and the forward-rearward movement can be distributed in the circumferential direction on the outer side of the camera body 200. The lock lever 210c for operating the lock release of the lock piece 210 is provided on the rear surface (rear end) of the camera body 200. The lock lever 210c is integrally molded with the lock piece 210. The lock piece 210 is biased by the spring 230 to be protruded to the outer side. The user can release the locked state by the lock piece 210 by operating the lock lever 210c to move the lock piece 210 in the direction opposite to the bias direction.

FIGS. 3B and 3C are perspective views of the rear surface of the camera body 200. Specifically, FIGS. 3B and 3C are diagrams for explaining the detail of the rib 220a. As shown in FIG. 3B, the rib 220a has a holding member contact portion 240 and a protecting member contact portion 250. The holding member contact portion 240 regulates the clockwise rotation and the forward-rearward movement of the camera body 200 with respect to the holding member 300. The protecting member contact portion 250 regulates the clockwise rotation and the forward-rearward movement of the camera body 200 with respect to the protecting member 400.

As shown in FIG. 3C, the holding member contact portion 240 has a first holding member contact portion 240a, a second holding member contact portion 240b, and a third holding member contact portion 240c. The first holding member contact portion 240a contacts a first camera body contact portion 320a (see FIG. 4C) of the holding member 300, and regulates the forward movement of the holding member 300 with respect to the camera body 200. The second holding member contact portion 240b contacts a second camera body contact portion 320b (see FIG. 4C) of the holding member 300, and regulates the rearward movement of the holding member 300 with respect to the camera body 200. The third holding member contact portion 240c contacts a third camera body contact portion 320c (see FIG. 4C) of the holding member 300, and regulates the counterclockwise rotation of the holding member 300 with respect to the camera body 200.

The protecting member contact portion 250 has a first protecting member contact portion 250a, a second protecting member contact portion 250b, and a third protecting member contact portion 250c. The first protecting member contact portion 250a regulates the forward movement of the protecting member 400 with respect to the camera body 200. The second protecting member contact portion 250b regulates the rearward movement of the protecting member 400 with respect to the camera body 200. The third protecting member contact portion 250c regulates the counterclockwise rotation of the protecting member 400 with respect to the camera body 200.

The configuration of the ribs 220b and 220c is the same as the configuration of the rib 220a, and the description is omitted.

1-3. The Configuration of the Holding Unit

The configuration of the holding member 300 will be described with reference to FIGS. 4A to 4C. FIGS. 4A to 4C are diagrams for explaining the configurations of the holding member 300. FIG. 4A is a perspective view of the holding member 300, seen from the rear side. In FIG. 4A, the side of an end face 340a of the holding member 300 is the front side, and the side of an end face 340b of the holding member 300 is the rear side. The holding member 300 has ribs 310a, 310b, 310c, and 310d on the inner surface of the ring 310. The ribs 310a, 310b, 310c, and 310d are portions regulating the rotation and movement (position) of the camera body 200 with respect to the holding member 300 when the holding member 300 is mounted on the camera body 200. The ribs 310a, 310b, 310c, and 310d have the same configuration. FIG. 4B is a front view of the holding member 300. As shown in FIG. 4B, the ribs are arranged at an interval of 90° on the inner side of the holding member 300 on which the camera body 200 is mounted. The camera body 200 is inserted from the end face 340a to hold the holding member 300. The ribs are arranged on the inner surface of the ring 310 at a position close to the end face 340b. With this, the rear surface of the camera body 200 is arranged at a position close to the end face 340b of the holding member 300. Therefore, the lock lever 210c provided on the rear surface of the camera body 200 can be easily operated.

The configuration of the rib 310a will be described with reference to FIG. 4C. FIG. 4C is a perspective view of the upper portion of the holding member 300, seen from the front side. The rib 310a has the first camera body contact portion 320a, the second camera body contact portion 320b, the third camera body contact portion 320c, and the first protrusion contact portion 330. The first camera body contact portion 320a contacts the first holding member contact portion 240a (see FIG. 3C) of the camera body 200, and regulates the forward movement of the holding member 300 with respect to the camera body 200. The second camera body contact portion 320b contacts the second holding member contact portion 240b (see FIG. 3C) of the camera body 200, and regulates the rearward movement of the holding member 300 with respect to the camera body 200. The third camera body contact portion 320c contacts the third holding member contact portion 240c (see FIG. 3C) of the camera body 200, and regulates the counterclockwise rotation of the holding member 300 with respect to the camera body 200.

The first protrusion contact portion 330 regulates the clockwise rotation of the holding member 300 with respect to the camera body 200.

1-4. The Configuration of the Protecting Member

Figure 5B:
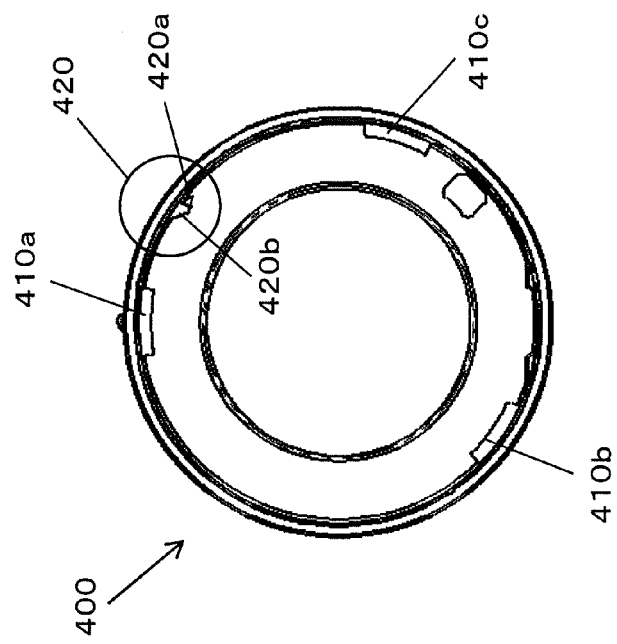
FIGS. 5A and 5B are diagrams for explaining the configurations of a protecting member.
Figure 5A:
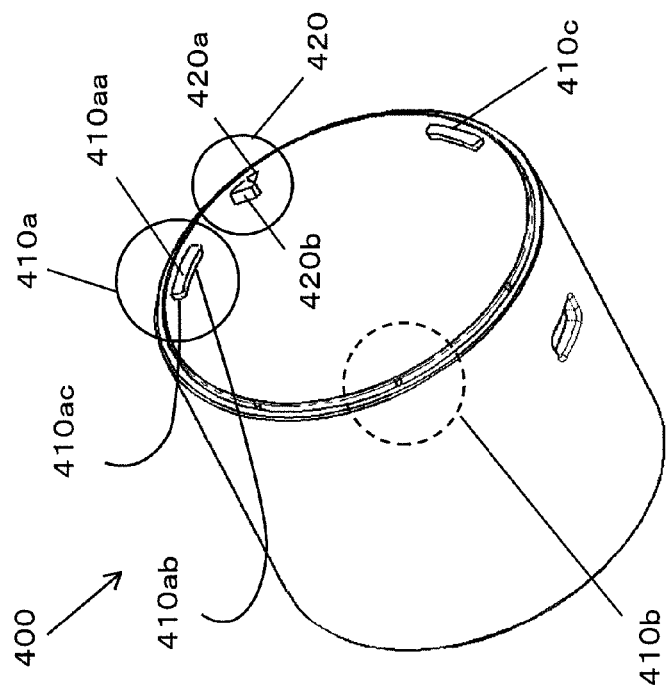

The configuration of the protecting member 400 will be described with reference to FIGS. 5A and 5B. FIGS. 5A and 5B are diagrams for explaining the configurations of the protecting member 400. Specifically, FIG. 5A is a perspective view of the protecting member 400, seen from the front side. As shown in FIG. 5A, the protecting member 400 has ribs 410a, 410b, and 410c, and a lock piece contact portion 420 at the front of the inner surface thereof. The ribs 410a, 410b, and 410c are portions regulating the forward-rearward movement and the counterclockwise rotation of the protecting member 400 with respect to the camera body 200 when the protecting member 400 is mounted on the camera body 200. FIG. 5B is a front view of the protecting member 400. As shown in FIG. 5B, the ribs 410a, 410b, and 410c are arranged in the positions of the protecting member 400 corresponding to the arranged positions of the ribs 220a, 220b, and 220c of the camera body 200 (see FIG. 3A). The lock piece contact portion 420 is a portion regulating the clockwise rotation of the protecting member 400 with respect to the camera body 200 when the protecting member 400 is mounted on the camera body 200. The lock piece contact portion 420 is arranged in the position of the protecting member 400 corresponding to the arranged position of the second protrusion 210b of the lock piece 210 of the camera body 200.

The configuration of the rib 410a will be described with reference to FIG. 5A. The rib 410a has a first camera body contact portion 410aa, a second camera body contact portion 410ab, and a third camera body contact portion 410ac. The first camera body contact portion 410aa contacts the first protecting member contact portion 250a (see FIG. 3C) of the camera body 200, and regulates the forward movement of the protecting member 400 with respect to the camera body 200. The second camera body contact portion 410ab contacts the second protecting member contact portion 250b (see FIG. 3C) of the camera body 200, and regulates the rearward movement of the protecting member 400 with respect to the camera body 200. The third camera body contact portion 410ac contacts the third protecting member contact portion 250c (see FIG. 3C) of the camera body 200, and regulates the counterclockwise rotation of the protecting member 400 with respect to the camera body 200.

The second protrusion contact portion 420a contacts the second protrusion 210b (see FIG. 2D) of the lock piece 210, and regulates the clockwise rotation of the protecting member 400 with respect to the camera body 200.

2. Operation

2-1. The Outline of the Operation of Engaging the Remote Camera

Figure 6A:
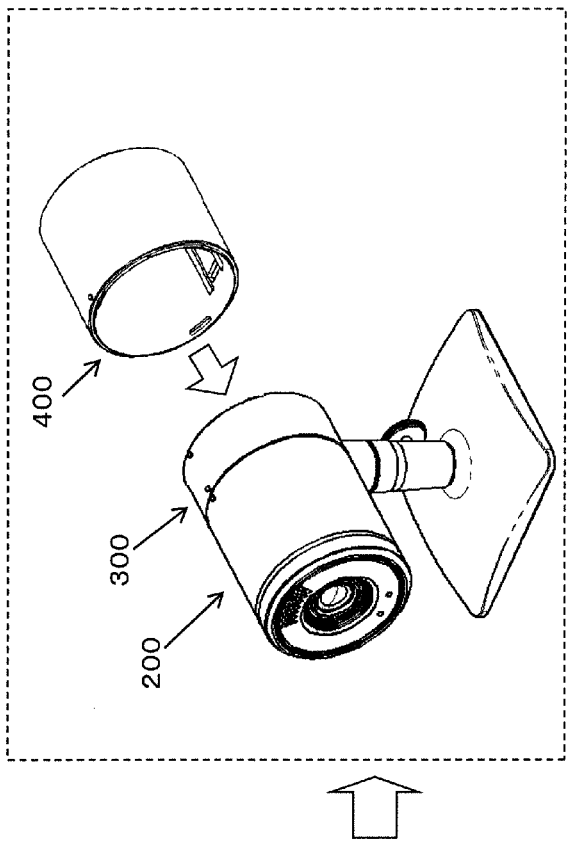
FIGS. 6A to 6C are outline views of the operation of engaging the remote camera.
Figure 6B:
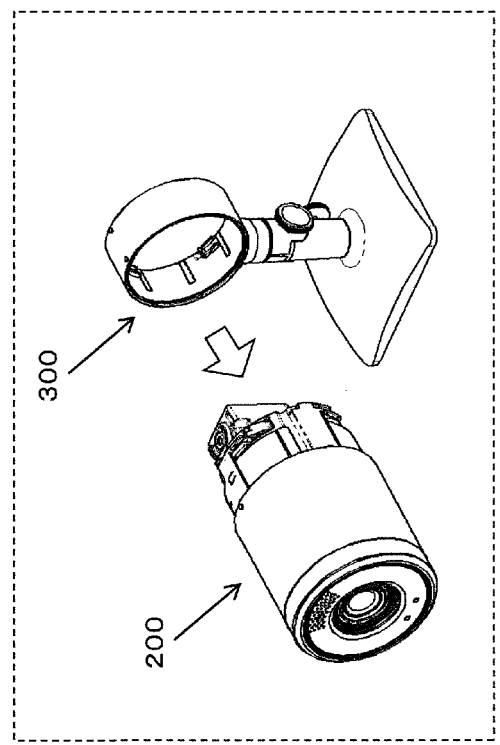
Figure 6C:
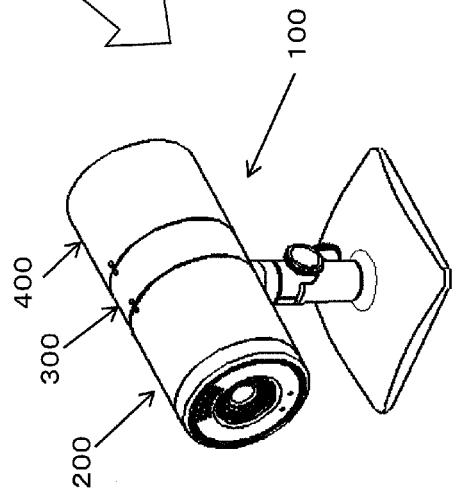

The outline of the operation of engaging the camera body 200 with the holding member 300 and the protecting member 400 will be described with reference to FIGS. 6A to 6C. FIGS. 6A to 6C are diagrams for explaining the outline of the operation of engaging the remote camera 100. First, as shown in FIG. 6A, the holding member 300 is engaged with the camera body 200. Next, as shown in FIG. 6B, the protecting member 400 is engaged in a state where the holding member 300 is engaged with the camera body 200. With this, as shown in FIG. 6C, the remote camera 100 in which the camera body 200, the holding member 300, and the protecting member 400 are held integrally is completed.

For releasing the engagement, first, the engagement of the protecting member 400 with the camera body 200 is released to remove the protecting member 400 from the camera body 200. Next, the engagement of the holding member 300 with the camera body 200 is released to remove the holding member 300 from the camera body 200. With this, the remote camera 100 can be separated into the camera body 200, the holding member 300, and the protecting member 400.

2-2. The Operation of Engaging the Camera Body with the Holding Member

Figure 7B:
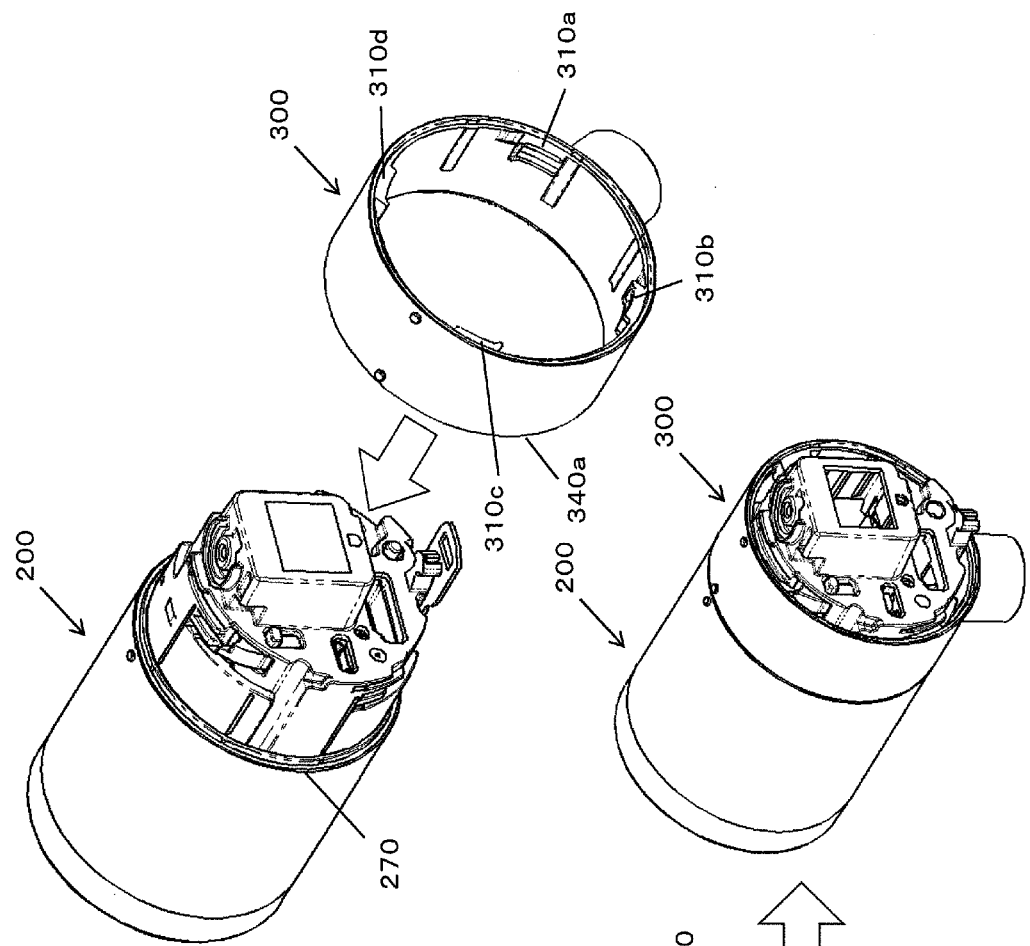
FIGS. 7A to 7C are state transition diagrams of the operation of engaging the camera body with the holding member.
Figure 7A:
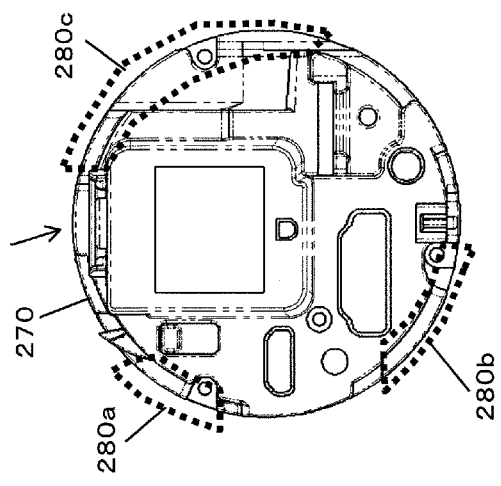
Figure 7C:
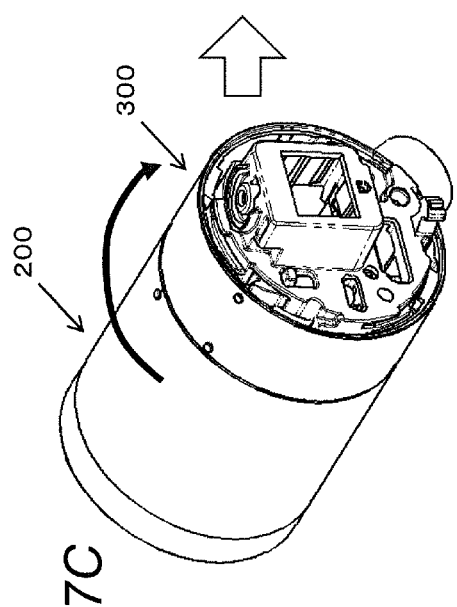

The operation of engaging the camera body 200 and the holding member 300 will be described with reference to FIGS. 7A to 7C. FIGS. 7A to 7C are diagrams showing the state transition of the operation of engaging the camera body 200 with the holding member 300. FIG. 7A is a rear view of the camera body 200. FIG. 7B is a perspective view of the camera body 200 separated from the holding member 300, seen from the rear surface side. FIG. 7C is a perspective view of the camera body 200 connected to the holding member 300, seen from the rear surface side. First, the camera body 200 and the holding member 300 are arranged so that the positions of the ribs 310a, 310b, 310c, and 310d of the holding member 300 in the circumferential direction shown in FIG. 7B coincide with the positions of spaces 280a, 280b, and 280c of the camera body 200 in the circumferential direction shown in FIG. 7A. Next, as shown in FIG. 7B, the camera body 200 and the holding member 300 are assembled so that the end face 340a of the holding member 300 contacts an end face 270 of the camera body 200. Next, as shown in FIG. 7C, the holding member 300 is rotated counterclockwise with respect to the camera body 200, or the camera body 200 is rotated clockwise with respect to the holding member 300, then the third camera body contact portion 320c (see FIG. 4C) contacts the third holding member contact portion 240c (see FIG. 3C).

The operation of engaging the camera body 200 with the holding member 300 will be described with reference to FIGS. 8A to 8E. FIG. 8A to 8E are state transition diagrams of the operation of engaging the holding member 300 by the lock piece 210 of the camera body 200. FIG. 8A is a diagram showing a state before the lock piece 210 is engaged with the holding member 300. FIG. 8B is a diagram showing a state during the lock piece 210 is engaged with the holding member 300. FIG. 8C is a diagram showing a state where the lock piece 210 is engaged with the holding member 300. FIG. 8D is a partially enlarged view of FIG. 8B. FIG. 8E is a partially enlarged view showing a state during the engagement is advanced from the state in FIG. 8D. In the state during the lock piece 210 is engaged with the holding member 300, shown in FIG. 8B, as shown in FIGS. 8D and 8E, a slope 210f of the lock piece 210 contacts the third camera body contact portion 320c. At this time, load F1 in the counterclockwise direction is applied from the third camera body contact portion 320c to the slope 210f of the lock piece 210. Load F1 in the rotation direction is converted to load F2 in the direction opposite to the bias direction of the spring 230 (see FIG. 3A). The lock piece 210 is thus lowered in the opposite protrusion direction until the first protrusion contact portion 330 passes through the first protrusion 210a. After the first protrusion contact portion 330 passes through the first protrusion 210a, the lock piece 210 returns to the first position (protruding position). As shown in FIG. 8C, the first protrusion 210a thus contacts the first protrusion contact portion 330. In this state, all of the ribs 220a, 220b, and 220c of the camera body 200 are engaged with any of the ribs 310a, 310b, 310c and 310d of the holding member 300. Therefore, the forward-rearward movement and the clockwise and counterclockwise rotation of the holding member 300 with respect to the camera body 200 are regulated.

The angle of the slope 210f of the lock piece 210 is set to a gentle angle with respect to load F1 in the counterclockwise direction. Specifically, the angle formed between the slope 210f and load F1 is set to be equal to or less than a predetermined angle. As the angle formed between the slope 210f and load F1 is larger, a larger rotation force is necessary when the holding member 300 is rotated to be engaged with the lock piece 210 in order to mount the holding member 300 on the camera body 200. Therefore, the predetermined angle is set to the angle at which the holding member 300 is rotatable against the biasing force of the spring 230 of the lock piece 210 when the typical user mounts the holding member 300.

Figure 9C:
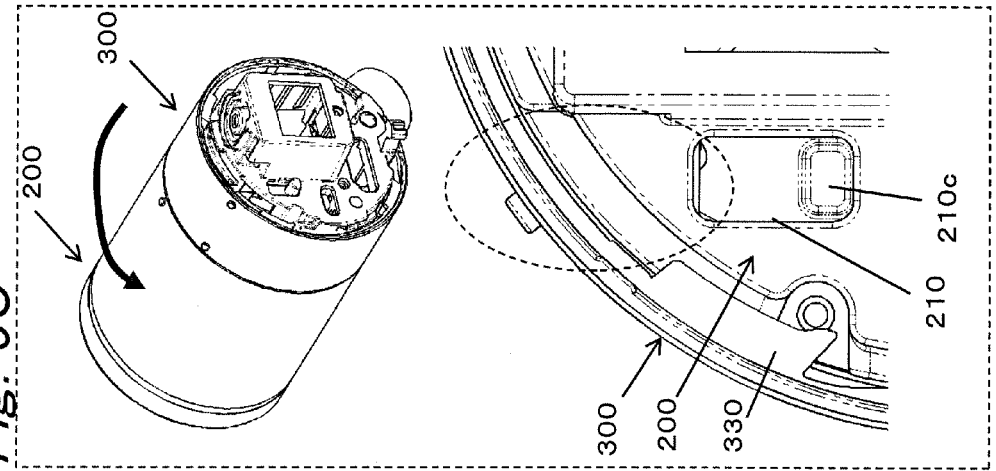
FIGS. 9A to 9C are state transition diagrams of the operation of releasing the engagement of the camera body with the holding member.
Figure 9B:
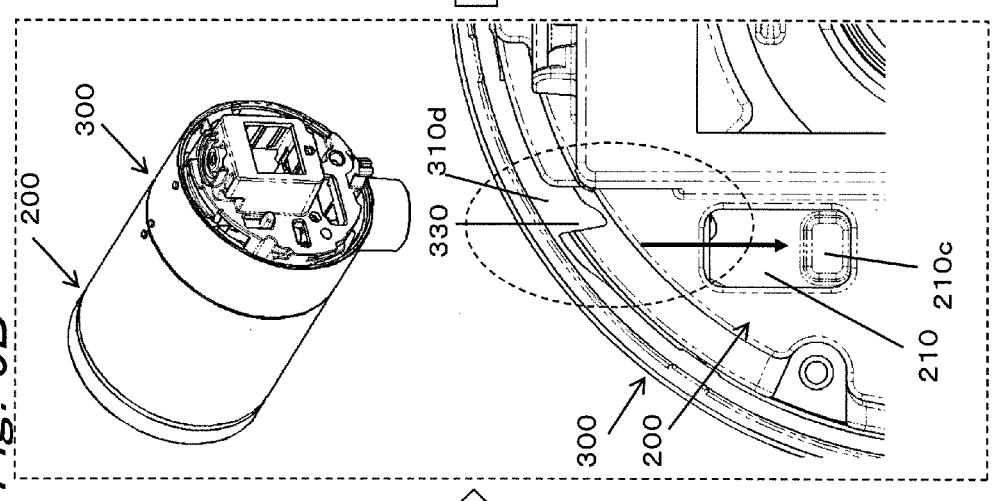
Figure 9A:
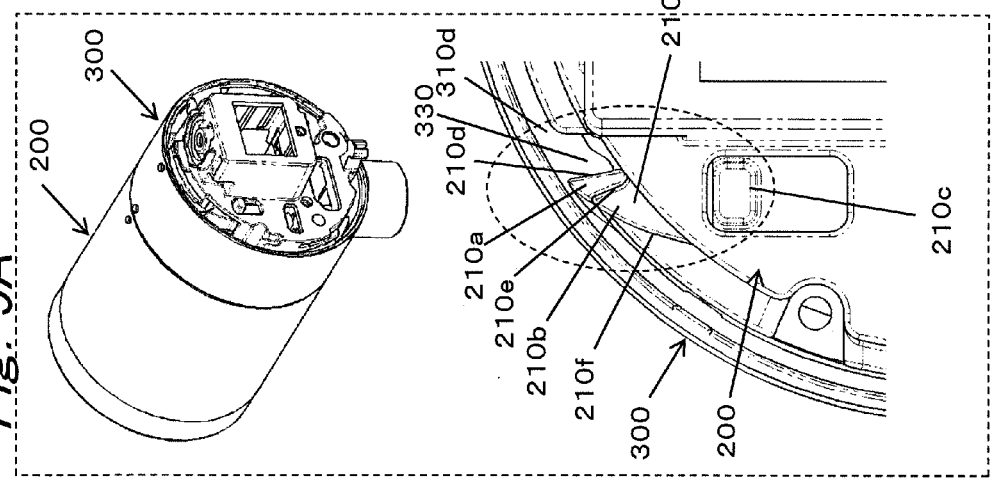

The operation of releasing the engagement of the camera body 200 with the holding member 300 will be described with reference to FIGS. 9A to 9C. FIGS. 9A to 9C are state transition diagrams of the operation of releasing the engagement of the camera body 200 with the holding member 300. FIG. 9A is a diagram showing a state where the lock piece 210 is engaged with the holding member 300. FIG. 9B is a diagram showing a state during the engagement of the lock piece 210 with the holding member 300 is released. FIG. 9C is a diagram showing a state where the engagement of the lock piece 210 with the holding member 300 is released. The lock piece 210 is located in the second position.

As shown in FIGS. 9A and 9B, the lock lever 210c is pushed down in the direction opposite to the bias direction of the spring 230 (see FIG. 3A). With this, as shown in FIG. 9B, the lock piece 210 is moved in the direction opposite to the bias direction of the spring 230, and brought into a state where the lock piece 210 does not contact the first protrusion contact portion 330. Therefore, the clockwise rotation of the holding member 300 with respect to the camera body 200 is not regulated so that the holding member 300 can be rotated in the clockwise direction.

As shown in FIG. 9C, the holding member 300 is rotated clockwise with respect to the camera body 200. FIG. 9C is a diagram showing a state where the holding member 300 is rotated clockwise with respect to the camera body 200. The camera body 200 and the holding member 300 are relatively rotated so that the positions of the ribs 310a, 310b, 310c, and 310d in the circumferential direction shown in FIG. 4B coincide with the positions of the spaces 280a, 280b, and 280c in the circumferential direction shown in FIG. 7A. In a state where the positions of the ribs 310a, 310b, 310c, and 310d coincide with the positions of the spaces 280a, 280b, and 280c, all the ribs 310a, 310b, 310c, and 310d shown in the drawing are not engaged with any of the ribs 220a, 220b, and 220c. Therefore, the holding member 300 can be moved rearward with respect to the camera body 200. In this state, as shown in FIG. 10, the holding member 300 is moved rearward with respect to the camera body 200, so that the engagement of the camera body 200 with the holding member 300 is released. That is, the holding member 300 can be removed from the camera body 200.

2-3. The Operation of Engaging the Camera Body with the Protecting Member

The operation of engaging the camera body 200 with the protecting member 400 will be described with reference to FIGS. 11A to 11C. FIGS. 11A to 11C are diagrams showing the state transition of the operation of engaging the camera body 200 with the protecting member 400. FIG. 11A is a rear view of the camera body 200 and the holding member 300. FIG. 11B is a perspective view of the camera body 200 and the holding member 300 separated from the protecting member 400, seen from the rear surface side. FIG. 11C is a perspective view of the state of connecting the camera body 200, the holding member 300, and the protecting member 400, seen from the rear surface side. First, the camera body 200 and the protecting member 400 are arranged so that the positions of the ribs 410a, 410b, and 410c and the lock piece contact portion 420 of the protecting member 400 in the circumferential direction shown in FIGS. 5A and 5B coincide with the positions of the spaces 280a, 280b, 280c, and 280d of the camera body 200 in the circumferential direction shown in FIG. 11A. Next, as shown in FIG. 11B, the protecting member 400 and the holding member 300 are assembled so that an end face 430 of the protecting member 400 contacts the end face 340b of the holding member 300. As shown in FIG. 11C, the protecting member 400 is rotated counterclockwise with respect to the camera body 200, or the camera body 200 is rotated clockwise with respect to the protecting member 400. With this, the third camera body contact portion 410ac (see FIG. 5A) contacts the third protecting member contact portion 250c (see FIG. 3C).

The operation of engaging the protecting member 400 by the lock piece 210 of the camera body 200 will be described with reference to FIGS. 12A to 12E. FIGS. 12A to 12E are state transition diagrams of the operation of engaging the protecting member 400 by the lock piece 210. FIG. 12A is a diagram showing a state where the lock piece 210 is engaged with the protecting member 400. FIG. 12B is a diagram showing a state during the engagement of the lock piece 210 with the protecting member 400 is released. FIG. 12C is a diagram showing a state where the engagement of the lock piece 210 with the protecting member 400 is released. FIG. 12D is a partially enlarged view of FIG. 12B. FIG. 12E is a partially enlarged view showing a state during the engagement release is advanced from the state in FIG. 12D. In the state during the engagement of the lock piece 210 with the protecting member 400 is released, shown in FIG. 12B, as shown in FIGS. 12D and 12E, the slope 210f of the lock piece 210 contacts a slope 420b. At this time, load F3 in the counterclockwise direction is applied from the slope 420b of the lock piece contact portion 420 to the slope 210f of the lock piece 210. Load F3 in the rotation direction is converted to load F4 in the direction opposite to the bias direction of the spring 230 (see FIG. 3A). The lock piece 210 is thus lowered in the opposite protrusion direction until the second protrusion contact portion 420a passes through the second protrusion 210b. As shown in FIG. 12C, after the second protrusion contact portion 420a passes through the second protrusion 210b, the lock piece 210 returns to the first position (protruding position). The second protrusion 210b thus contacts the second protrusion contact portion 420a. In this state, all of the ribs 410a, 410b, and 410c of the protecting member 400 are engaged with the corresponding ribs 310a, 310b, 310c, and 310d of the holding member 300. Therefore, the forward-rearward movement and the clockwise and counterclockwise rotation of the protecting member 400 with respect to the camera body 200 are regulated.

The angle of the slope 210f of the lock piece 210 is set to a gentle angle with respect to load F3 in the counterclockwise direction. Specifically, the angle formed between the slope 210f and load F3 is set to be equal to or less than a predetermined angle. As the angle formed between the slope 210f and load F3 is larger, a large rotating force is necessary when the protecting member 400 is rotated to engage the protecting member 400 with the lock piece 210 in order to mount the protecting member 400 on the camera body 200. Therefore, the predetermined angle is set to the angle at which the protecting member 400 is rotatable against the biasing force of the spring 230 of the lock piece 210 when the typical user mounts the protecting member 400.

The operation of releasing the engagement of the camera body 200 with the protecting member 400 will be described with reference to FIGS. 13A to 13C. FIGS. 13A to 13C are state transition diagrams of the operation of releasing the engagement of the camera body 200 with the protecting member 400. FIG. 13A is a diagram showing a state where the lock piece 210 is engaged with the protecting member 400. FIG. 13B is a diagram showing a state during the engagement of the lock piece 210 with the protecting member 400 is released. FIG. 13C is a diagram showing a state where the engagement of the lock piece 210 with the protecting member 400 is released.

As shown in FIGS. 13A and 13B, the protecting member 400 is rotated clockwise with respect to the camera body 200. Load F5 above a certain level is applied in the clockwise direction to convert load F5 to load F6 in the direction opposite to the bias direction of the spring 230 (see FIG. 3A). Then, as shown in FIGS. 13B and 13C, the lock piece 210 is moved in the direction opposite to the bias direction of the spring 230. The engagement of the second protrusion 210b with the second protrusion contact portion 420a is released. The angle of the second contact surface 210e, which contacts the protecting member 400, of the second protrusion 210b is formed gentler than the angle of the first contact surface 210d, which contacts the holding member 300, of the first protrusion 210a. Specifically, the angle formed by the second contact surface 210e with respect to the movement direction of the lock piece 210 is formed larger than the angle formed by the first contact surface 210d with respect to the movement direction of the lock piece 210.

FIGS. 14A to 14C are diagrams showing states where the protecting member 400 is rotated clockwise with respect to the camera body 200. The camera body 200 and the protecting member 400 are relatively rotated so that the positions of the ribs 410a, 410b, and 410c and the lock piece contact portion 420 in the circumferential direction shown in FIGS. 5A and 5B coincide with the positions of the spaces 280a, 280b, 280c, and 280d in the circumferential direction shown in FIG. 11A. In this state, all of the ribs 410a, 410b, and 410c (see FIG. 5B) are not engaged with any of the ribs 220a, 220b, and 220c (see FIG. 3D). Therefore, the protecting member 400 can be moved rearward with respect to the camera body 200. In a state where the positions of the ribs 410a, 410b, and 410c and the lock piece contact portion 420 coincide with the positions of the spaces 280a, 280b, 280c, and 280d, the protecting member 400 is moved rearward with respect to the camera body 200, so that the engagement of the camera body 200 with the protecting member 400 is released. That is, the protecting member 400 can be removed from the camera body 200.

3. Effects

As described above, the remote camera 100 of this disclosure has the camera body 200, the holding member 300 held by the camera body 200, and the protecting member 400 held by the camera body 200 via the holding member 300. The camera body 200 has the holding member contact portion 240 regulating the rotation of the holding member 300 in a first direction (the counterclockwise rotation of the holding member 300 with respect to the camera body 200), the protecting member contact portion 250 regulating the rotation of the protecting member 400 in the first direction (the counterclockwise rotation of the protecting member 400 with respect to the camera body 200), and the lock piece 210 regulating the rotation of the holding member 300 and the protecting member 400 in a second direction (the clockwise rotation of the holding member 300 with respect to the camera body 200 and the clockwise rotation of the protecting member 400 with respect to the camera body 200). With this configuration, the remote camera 100 which can be easily mounted and removed can be provided.

According to this configuration, two members of the holding member 300 and the protecting member 400 can be brought into a different engagement state by one lock piece 210. As a configuration for bringing into the different engagement state, there is a configuration in which different lock pieces are provided corresponding to the holding member 300 and the protecting member 400. However, in this configuration, two lock pieces and two springs (biasing members) are necessary. In this embodiment, the different engagement state can be realized by one lock piece 210 and one spring 230. With this, the number of components and the size of the camera body 200 can be reduced.

For example, the lock piece 210 has the first protrusion 210a regulating the rotation of the holding member 300 in the second direction, and the second protrusion 210b regulating the rotation of the protecting member 400 in the second direction. The rotation regulation of the protecting member 400 by the second protrusion 210b is weaker than the rotation regulation of the holding member 300 by the first protrusion 210a. With this, without releasing the held state of the camera body 200 with respect to the holding member 300, the held state of the camera body 200 with respect to the protecting member 400 can be released.

For example, the first protrusion 210a regulates the rotation of the holding member 300 in the second direction by contacting the holding member 300. The second protrusion 210b regulates the rotation of the protecting member 400 in the second direction by contacting the protecting member 400. The angle of the surface, which contacts the protecting member 400, of the second protrusion 210b is gentler than the angle of the surface, which contacts the holding member 300, of the first protrusion 210a. With this, the protecting member 400 can be removed from the camera body 200 without operating the lock piece 210.

For example, the engaging amount of the second protrusion 210b with respect to the protecting member 400 when the second protrusion 210b contacts the protecting member 400 is smaller than the engaging amount of the first protrusion 210a with respect to the holding member 300 when the first protrusion 210a contacts the holding member 300. With this, in the case that the protecting member 400 itself is operated to remove the protecting member 400 from the camera body 200 without operating the lock piece 210, the engagement of the second protrusion 210b with the second protrusion contact portion 420a is released, but the engagement of the first protrusion 210a with the first protrusion contact portion 330 is not released.

For example, the lock piece 210 can be moved between the first position where the lock piece 210 contacts the holding member 300 and the protecting member 400 and the second position where the lock piece 210 does not contact the holding member 300 and the protecting member 400. The camera body 200 has the spring 230 that biases the lock piece 210 to the first position, and the lock lever 210c that moves the lock piece 210 to the second position against biasing by the spring 230. The protecting member 400 is rotated in the second direction with respect to the camera body 200 against the biasing of the spring 230 to move the lock piece 210 to the second position for releasing the contact of the second protrusion 210b of the lock piece 210 with the protecting member 400. The lock lever 210c is operated against the biasing of the spring 230 to move the lock piece 210 to the second position for releasing the contact of the first protrusion 210a of the lock piece 210 with the holding member 300.

For example, the contact of the first protrusion 210*a* of the lock piece 210 with the holding member 300 may be released as follows. That is, the holding member 300 is rotated in the second direction with respect to the camera body 200 against the biasing of the spring 230 so that the lock piece 210 is moved to the second position to release the contact of the first protrusion 210*a* of the lock piece 210 with the holding member 300.

In the embodiment, the camera body 200 has a pawl having a two-stage structure. The pawl is not limited to this. For instance, the holding member 300 may have a pawl having a two-stage structure. However, typically, operation to the lock lever 210*c* and connection or disconnection of the cable to the connector is made in a state where the camera body 200 is held by the holding member 300 after the protecting member 400 is mounted or dismounted. Therefore, the camera body 200 may have the pawl having a two-stage structure so that the user can easily mount or dismount the protecting member 400.

As the illustration of the technique in this disclosure, the embodiment has been described above. For that, the accompanying drawings and the detailed description have been provided.

Therefore, among the components described in the accompanying drawings and the detailed description, not only the components essential for solving the problems, but also the components not essential for solving the problems, can be included to illustrate the technique. Those non-essential components described in the accompanying drawings and the detailed description should not be immediately identified to be essential.

The embodiment illustrates the technique in this disclosure. Therefore, various changes, substitutions, additions, and omissions can be made in the claims and the scope equal thereto.

INDUSTRIAL APPLICABILITY

This disclosure is not limited to the embodiment of the remote camera 100. That is, this disclosure is applicable to an electronic apparatus to be held, such as a lighting device, a microphone unit, and a speaker unit.

What is claimed is:

1. An electronic apparatus having a first unit, a second unit held by the first unit, and a third unit held by the first unit via the second unit,
wherein the first unit has:
a first rotation regulating portion that regulates the rotation of the second unit in a first direction;
a second rotation regulating portion that regulates the rotation of the third unit in the first direction; and
a third rotation regulating portion that regulates the rotation of the second unit and the third unit in a second direction opposite to the first direction,
wherein the third rotation regulating portion can be moved between a first position where the third rotation regulating portion contacts the second unit and the third unit and a second position where the third rotation regulating portion does not contact the second unit and the third unit,
wherein the first unit has a biasing member that biases the third rotation regulating portion to the first position.

2. The electronic apparatus according to claim 1,
wherein the third rotation regulating portion has:
a first regulating portion that regulates the rotation of the second unit in the second direction; and
a second regulating portion that regulates the rotation of the third unit in the second direction,
wherein the rotation regulation of the third unit by the second regulating portion is weaker than the rotation regulation of the second unit by the first regulating portion.

3. The electronic apparatus according to claim 2,
wherein the first regulating portion is a first protruding portion that regulates the rotation of the second unit in the second direction by contacting the second unit,
wherein the second regulating portion is a second protruding portion that regulates the rotation of the third unit in the second direction by contacting the third unit,
wherein the angle of the surface, which contacts the third unit, of the second protruding portion is gentler than the angle of the surface, which contacts the second unit, of the first protruding portion.

4. The electronic apparatus according to claim 3,
wherein the engaging amount of the second protruding portion with respect to the third unit when the second protruding portion contacts the third unit is smaller than the engaging amount of the first protruding portion with respect to the second unit when the first protruding portion contacts the second unit.

5. The electronic apparatus according to claim 4,
wherein the first unit has:
an operating member that moves the third rotation regulating portion to the second position against biasing by the biasing member,
wherein the third unit is rotated in the second direction with respect to the first unit against the biasing of the biasing member to move the third rotation regulating portion to the second position for releasing the contact of the second protruding portion of the third rotation regulating portion with the third unit,
wherein the operating member is operated against the biasing of the biasing member to move the third rotation regulating portion to the second position for releasing the contact of the first protruding portion of the third rotation regulating portion with the second unit.

6. The electronic apparatus according to claim 4,
wherein the third rotation regulating portion can be moved between a first position where the third rotation regulating portion contacts the second unit and the third unit and a second position where the third rotation regulating portion does not contact the second unit and the third unit,
wherein the first unit has a biasing member that biases the third rotation regulating portion to the first position,
wherein the second unit is rotated in the second direction with respect to the first unit against the biasing of the biasing member to move the third rotation regulating portion to the second position for releasing the contact of the first protruding portion of the third rotation regulating portion with the second unit,
wherein the third unit is rotated in the second direction with respect to the first unit against the biasing of the biasing member to move the third rotation regulating portion to the second position for releasing the contact of the second protruding portion of the third rotation regulating portion with the third unit.

7. The electronic apparatus according to claim 3,
wherein the third rotation regulating portion can be moved between a first position where the third rotation regulating portion contacts the second unit and the third unit and a second position where the third rotation regulating portion does not contact the second unit and the third unit, wherein the first unit has:

a biasing member that biases the third rotation regulating portion to the first position; and an operating member that moves the third rotation regulating portion to the second position against biasing by the biasing member, wherein the third unit is rotated in the second direction with respect to the first unit against the biasing of the biasing member to move the third rotation regulating portion to the second position for releasing the contact of the second protruding portion of the third rotation regulating portion with the third unit, wherein the operating member is operated against the biasing of the biasing member to move the third rotation regulating portion to the second position for releasing the contact of the first protruding portion of the third rotation regulating portion with the second unit.

8. The electronic apparatus according to claim 3, wherein the third rotation regulating portion can be moved between a first position where the third rotation regulating portion contacts the second unit and the third unit and a second position where the third rotation regulating portion does not contact the second unit and the third unit, wherein the first unit has a biasing member that biases the third rotation regulating portion to the first position, wherein the second unit is rotated in the second direction with respect to the first unit against the biasing of the biasing member to move the third rotation regulating portion to the second position for releasing the contact of the first protruding portion of the third rotation regulating portion with the second unit, wherein the third unit is rotated in the second direction with respect to the first unit against the biasing of the biasing member to move the third rotation regulating portion to the second position for releasing the contact of the second protruding portion of the third rotation regulating portion with the third unit.

9. The electronic apparatus according to claim 2, wherein the first regulating portion is a first protruding portion that to regulates the rotation of the second unit in the second direction by contacting the second unit, wherein the second regulating portion is a second protruding portion that regulates the rotation of the third unit in the second direction by contacting the third unit, wherein the engaging amount of the second protruding portion with respect to the third unit when the second protruding portion contacts the third unit is smaller than the engaging amount of the first protruding portion with respect to the second unit when the first protruding portion contacts the second unit.

10. The electronic apparatus according to claim 9, wherein the first unit has:

an operating member that moves the third rotation regulating portion to the second position against biasing by the biasing member, wherein the third unit is rotated in the second direction with respect to the first unit against the biasing of the biasing member to move the third rotation regulating portion to the second position for releasing the contact of the second protruding portion of the third rotation regulating portion with the third unit, wherein the operating member is operated against the biasing of the biasing member to move the third rotation regulating portion to the second position for releasing the contact of the first protruding portion of the third rotation regulating portion with the second unit.

11. The electronic apparatus according to claim 9, wherein the third rotation regulating portion can be moved between a first position where the third rotation regulating portion contacts the second unit and the third unit and a second position where the third rotation regulating portion does not contact the second unit and the third unit, wherein the first unit has a biasing member that biases the third rotation regulating portion to the first position, wherein the second unit is rotated in the second direction with respect to the first unit against the biasing of the biasing member to move the third rotation regulating portion to the second position for releasing the contact of the first protruding portion of the third rotation regulating portion with the second unit, wherein the third unit is rotated in the second direction with respect to the first unit against the biasing of the biasing member to move the third rotation regulating portion to the second position for releasing the contact of the second protruding portion of the third rotation regulating portion with the third unit.

12. An electronic apparatus which holds a second unit and holds a third unit via the second unit comprising:

a first rotation regulating portion that regulates the rotation of the second unit in a first direction;

a second rotation regulating portion that regulates the rotation of the third unit in the first direction; and a third rotation regulating portion that regulates the rotation of the second unit and the third unit in a second direction opposite to the first direction, wherein the third rotation regulating portion can be moved between a first position where the third rotation regulating portion contacts the second unit and the third unit and a second position where the third rotation regulating portion does not contact the second unit and the third unit, wherein the first unit has a biasing member that biases the third rotation regulating portion to the first position.

13. The electronic apparatus according to claim 12, wherein the third rotation regulating portion has:

a first regulating portion that regulates the rotation of the second unit in the second direction; and a second regulating portion that regulates the rotation of the third unit in the second direction, wherein the rotation regulation of the third unit by the second regulating portion is weaker than the rotation regulation of the second unit by the first regulating portion.

14. The electronic apparatus according to claim 13, wherein the first regulating portion is a first protruding portion that regulates the rotation of the second unit in the second direction by contacting the second unit, wherein the second regulating portion is a second protruding portion that regulates the rotation of the third unit in the second direction by contacting the third unit, wherein the angle of the surface, which contacts the third unit, of the second protruding portion is gentler than the angle of the surface, which contacts the second unit, of the first protruding portion.

15. The electronic apparatus according to claim 13, wherein the first regulating portion is a first protruding portion that regulates the rotation of the second unit in the second direction by contacting the second unit, wherein the second regulating portion is a second protruding portion that regulates the rotation of the third unit in the second direction by contacting the third unit,
wherein the engaging amount of the second protruding portion with respect to the third unit when the second protruding portion contacts the third unit is smaller than the engaging amount of the first protruding portion with respect to the second unit when the first protruding portion contacts the second unit.

16. The electronic apparatus according to claim 14,
wherein the engaging amount of the second protruding portion with respect to the third unit when the second protruding portion contacts the third unit is smaller than the engaging amount of the first protruding portion with respect to the second unit when the first protruding portion contacts the second unit.

* * * * *